Feb. 27, 1934.  M. C. SPENCER  1,948,546
TELEVISION MOTOR
Filed March 18, 1932

Inventor,
Millard Cole Spencer,
By *Samuel W. Balch*
   Attorney.

Patented Feb. 27, 1934

1,948,546

UNITED STATES PATENT OFFICE 1,948,546

TELEVISION MOTOR

Millard Cole Spencer, East Orange, N. J., assignor to Crocker-Wheeler Electric Manufacturing Company, Ampere, N. J., a corporation of New Jersey Application March 18, 1932. Serial No. 599,665

2 Claims. (Cl. 172—120)

The object of this invention is to provide a self-starting synchronous electric motor drive suitable for television scanning disks, and also applicable for driving other apparatus, as clocks and teletype machines wherein transmitters and receivers require to be brought into and operated in register.

In the accompanying sheet of drawings which forms a part of this description,

Figure 1:
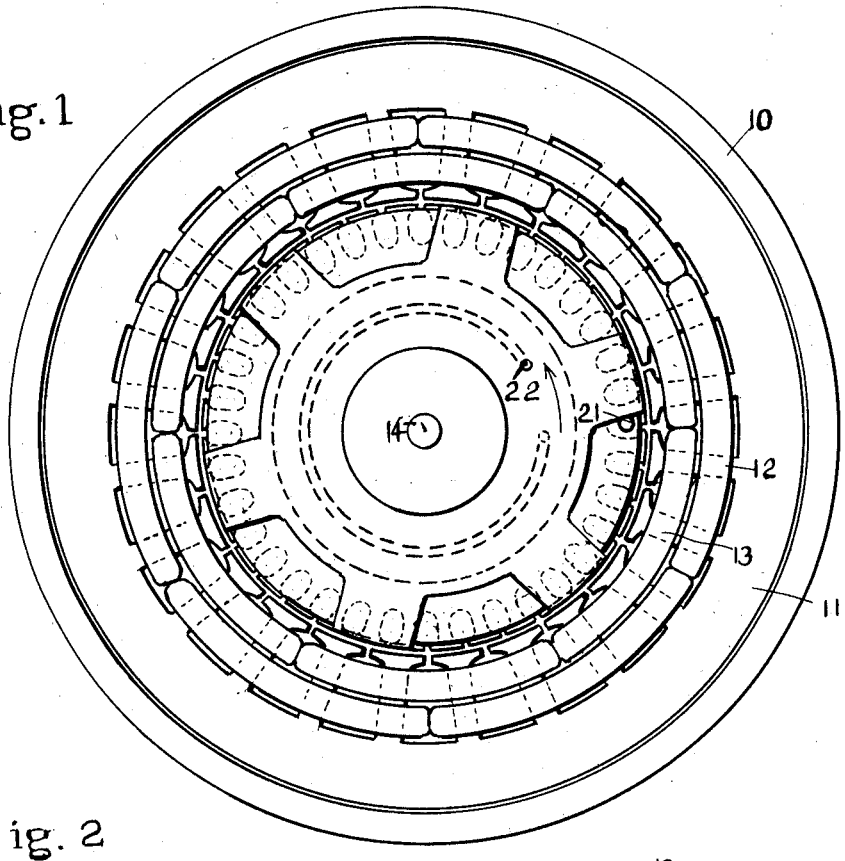
Figure 1 is an axial view of the motor, the cover being removed.
Figure 2:
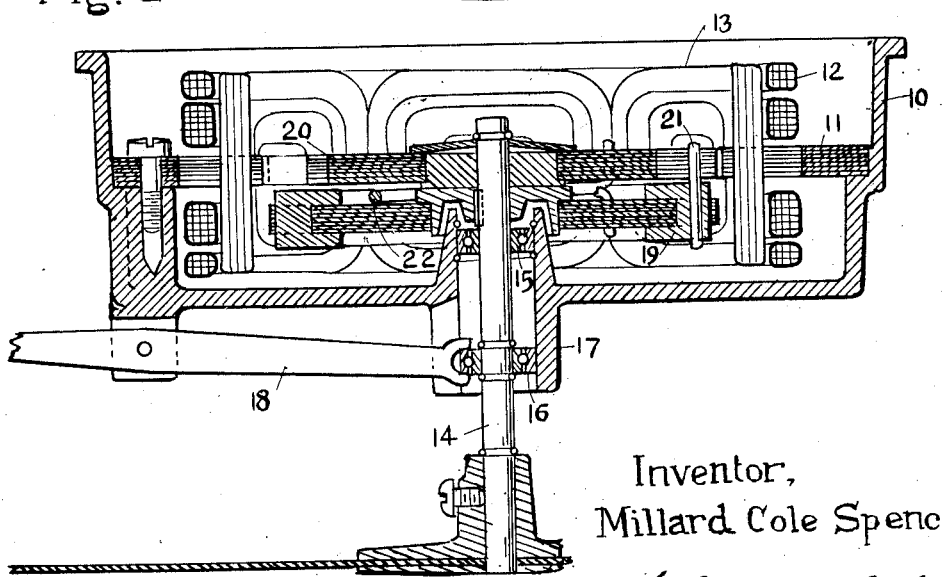
Fig. 2 is a section through the axis of the motor.

A motor frame 10 contains a stator which comprises a core 11 with a revolving field induced by alternating current in the coils 12 and 13 in displaced phase. A shaft 14 is supported by upper ball bearings 15 and lower ball bearings 16 which are carried on a hub 17 of the frame. The outer race of the upper ball bearing is fixed in the hub and the shaft is free to slide through the inner race. The outer race of the lower ball bearing is engaged by forks of a hand-operated lever 18 by which it can be caused to slide in the hub and the shaft is fixed in the inner race. This ball bearing serves also as a thrust bearing.

The shaft has rigid thereon, as by keying or a drive fit, a squirrel-cage rotor 19 which by lifting the shaft through the hand-lever can be brought into the polar cavity of the stator and will form an induction motor with self-starting characteristics and running characteristics slightly below the desired running speed.

The shaft also carries a synchronous rotor 20 which lies in the polar cavity of the stator when the shaft is in its lowered position, and this rotor with the stator forming a synchronous motor running at the desired speed which is slightly above the speed at which the shaft will be driven by the squirrel-cage rotor. The synchronous rotor can develop no material torque until the speed for which it is designed is approached.

In starting, in the operation of television apparatus, the squirrel-cage rotor is lifted by the hand-lever into operative relation with the stator and drives the scanning disk at nearly the required speed. The synchronous rotor is free on the shaft but has been carried around by a pin 21 which projects from the squirrel-cage rotor into a fork between two poles of the synchronous rotor. The synchronous rotor is held back against the pin by a spring 22, the tension of which is less than the torque of the synchronous motor but greater than the normal driving torque required. Therefore, the synchronous rotor on being brought into operative relation with the stator will accelerate to synchronous speed. In doing this it turns away from the pin and has only to overcome the tension of the spring and its own inertia and not the inertia of all of the rotating parts. The spring immediately thereafter brings the pin again into contact and thereby eliminates its resilience from the transmission so that the scanning disk will rotate positively with the synchronous rotor. There can thereafter be no departure from register and wavering of the image.

I claim,

1. In a motor, a stator having two windings in displaced phase relation for producing a revolving magnetic field and a bearing hub, a rotor with two members one member having strong synchronous motor characteristics and normally located within the influence of the revolving magnetic field and the other member having strong starting characteristics normally located outside the influence of the revolving magnetic field, a shaft on which the two rotor members are mounted, two ball bearings mounted in the hub for supporting the shaft one of the ball bearings having its outer race fixed in the hub and its inner race free to slide on the shaft and the other ball bearing having its inner race fixed on the shaft and its outer race free to slide in the hub, and a hand operated forked lever with its forks engaged with the outer race of the ball bearing which is free to slide in the hub by means of which the shaft may be moved in an axial direction and the rotor member having strong starting characteristics brought within the influence of the revolving magnetic field at starting.

2. In a vertical shaft motor, a stator having two windings in displaced phase relation for producing a revolving magnetic field and a bearing hub, a rotor with two members one member having strong synchronous motor characteristics and normally located within the influence of the revolving magnetic field and the other member having strong starting characteristics normally located outside the influence of the revolving magnetic field, a vertical shaft on which the two rotor members are mounted, two ball bearings in the hub for supporting the shaft one of the ball bearings having its outer race fixed in the hub and its inner race free to slide on the shaft and the other ball bearing having its inner race fixed on the shaft and its outer race free to slide in the hub, and a hand operated forked lever with its forks engaged with the outer race of the ball bearing which is free to slide in the hub by means of which the shaft may be moved in an axial direction and the rotor member having strong starting characteristics brought within the influence of the revolving magnetic field at starting.

MILLARD COLE SPENCER.